Oct. 20, 1925.
W. G. BALDWIN
RADIUS ROD BRACE
Filed Aug. 15, 1923
1,558,218
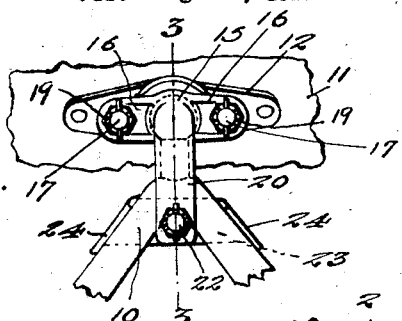
Fig. 1.
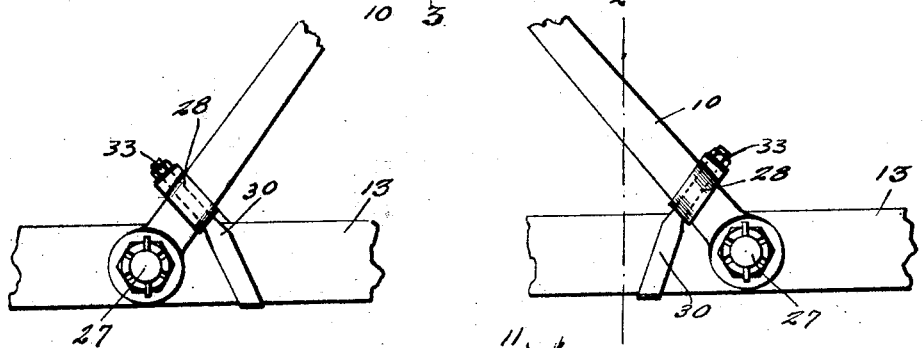
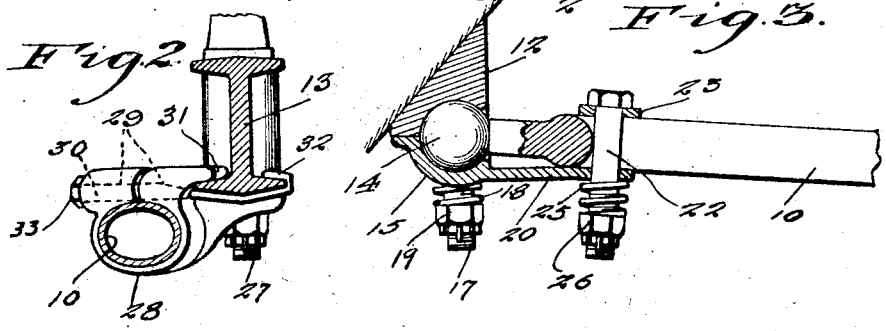
Fig. 2.    Fig. 3.
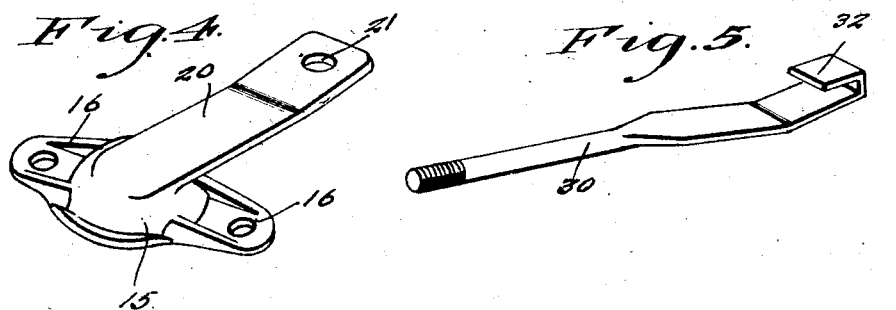
Fig. 4.    Fig. 5.
W. G. Baldwin
INVENTOR
BY Victor J. Evans
ATTORNEY
WITNESSES
H. G. Thomas Patented Oct. 20, 1925.

1,558,218

UNITED STATES PATENT OFFICE.

WILLIAM G. BALDWIN, OF CASTLE HAYNE, NORTH CAROLINA.

RADIUS-ROD BRACE.

Application filed August 15, 1923. Serial No. 657,619.

*To all whom it may concern:*

Be it known that I, WILLIAM G. BALDWIN, a citizen of the United States, residing at Castle Hayne, in the county of New Hanover and State of North Carolina, have invented new and useful Improvements in Radius-Rod Braces, of which the following is a specification.

This invention relates to means for attaching radius rods to automobiles and has for an object the provision of improved means for strengthening and bracing the ball and socket connection of the rod, whereby the connection will not become loose and noisy when slightly worn, while accidental removal of the ball from the socket will be prevented.

Another object of the invention is the provision of improved means for securing the bifurcated ends of the rod to the automobile axle, whereby these connections will be reinforced and strengthened and noise due to wear eliminated.

With the above and other objects in view, the invention further includes the following novel features and details of construction, to be hereinafter more fully described, illustrated in the accompanying drawings and pointed out in the appended claims.

In the drawings:—

Figure 1 is a bottom plan view illustrating an application of the invention.

Figure 2 is a section taken substantially on the line 2—2 of Figure 1.

Figure 3 is a section taken substantially on the line 3—3 of Figure 1.

Figure 4 is a detail perspective view of the socket cap and its arm.

Figure 5 is a like view of the bolt which connects the radius rod to the automobile axle.

Referring in detail to the drawings wherein like characters of reference denote corresponding parts, the reference character 10 indicates a radius rod, 11 a portion of the crank case, 12 the socket member and 13 the axle of an automobile, the ball at the apex of the rod being indicated at 14.

In order to properly hold the ball 14 within the socket of the member 12, the present invention provides a socket cap 15. This cap is provided with oppositely extending apertured ears 16 for the passage of the usual bolts 17 which extend from the socket member 12 and which serve to connect the cap to the said member. Springs 18 are interposed between the cap and adjusting nuts 19 so as to take up wear, the said nuts being capable of adjustment to regulate the tension of the springs.

Preferably formed integral with and extending from the cap 15 is an arm 20, whose outer end is provided with an opening 21 for the passage of a bolt 22, the said bolt extending through the forked end of the rod 10 and through a plate 23 which bridges this end and which is provided with curved extremities 24. The bolt 22 is surrounded by a spring 25 which is tensioned by means of an adjusting nut 26 so as to take up wear and hold the outer end of the arm into proper contacting engagement with the rod 10. This form of connection permits of free movement of the ball and socket connection occasioned by any qualities of unevenness of the road.

The bifurcated ends of the rod 10 are secured to the axle by means of the usual bolts 27, but as a further securing means, the invention provides a clip 28 which engages around each end of the rod and whose ends are provided with registering openings 29 for the passage of a bolt 30. In addition, one end of the clip is provided with a lug 31 which engages over one flange of the axle 13, while the other flange of the said axle is engaged by a hook 32 formed on the outer ends of the bolts 30. The opposite ends of the bolts are threaded for engagement by nuts 33 which bear against the ends of the clips 28 and act to force the lugs 31 and the hooks 32 over the axle flanges.

This acts to securely hold the bifurcated ends of the rod 10 to the axle 13 and permits of adjustment from time to time to take up wear.

The invention is susceptible of various changes in its form, proportions and minor details of construction and the right is herein reserved to make such changes as properly fall within the scope of the appended claims.

Having described the invention what is claimed is:—

1. In combination with a motor vehicle radius rod, a ball at one end of said rod, a socket member for receiving the ball, a socket cap, resilient means for securing the socket cap to the socket member, an arm carried by and extending from the cap and means for resiliently securing said arm to the radius rod.

2. In combination with a motor vehicle radius rod, a ball at one end of said rod, a socket member for receiving the ball, a socket cap, resilient means for securing the socket cap to the socket member, an arm integral with the socket cap and means for resiliently securing said arm to the radius rod.

In testimony whereof I affix my signature.

WILLIAM G. BALDWIN.